United States Patent
Michalopoulos et al.

(10) Patent No.: US 12,199,899 B2
(45) Date of Patent: Jan. 14, 2025

(54) MEASUREMENTS FOR ON-DEMAND POSITIONING REFERENCE SIGNAL TRANSMISSION

(71) Applicant: Nokia Technologies Oy, Espoo (FI)

(72) Inventors: Diomidis Michalopoulos, Munich (DE); Ahmad Awada, Munich (DE); Eva Perez, Munich (DE); Mikko Säily, Laukkoski (FI); Andreas Maeder, Würzburg (DE); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 404 days.

(21) Appl. No.: 17/434,622

(22) PCT Filed: Mar. 19, 2020

(86) PCT No.: PCT/FI2020/050175
§ 371 (c)(1),
(2) Date: Aug. 27, 2021

(87) PCT Pub. No.: WO2020/193853
PCT Pub. Date: Oct. 1, 2020

(65) Prior Publication Data
US 2022/0173857 A1    Jun. 2, 2022

Related U.S. Application Data

(60) Provisional application No. 62/823,973, filed on Mar. 26, 2019.

(51) Int. Cl.
*H04L 5/00* (2006.01)
*G01S 5/02* (2010.01)
*G01S 5/10* (2006.01)

(52) U.S. Cl.
CPC .......... *H04L 5/0048* (2013.01); *G01S 5/0236* (2013.01); *G01S 5/10* (2013.01); *H04L 5/0053* (2013.01)

(58) Field of Classification Search
CPC ... H04L 5/0053; H04L 5/0094; H04L 5/0048; H04L 5/0035; H04B 17/318; H04B 17/336; G01S 5/10; H04W 24/10; H04W 24/08
See application file for complete search history.

(56) References Cited

U.S. PATENT DOCUMENTS

2012/0040696 A1    2/2012  Siomina et al.
2017/0059689 A1    3/2017  Edge et al.
(Continued)

FOREIGN PATENT DOCUMENTS

| CN | 103314613 A | 9/2013 |
| CN | 108702585 A | 10/2018 |
| WO | 2018/111173 A1 | 6/2018 |

OTHER PUBLICATIONS

Office action received for corresponding Japanese Patent Application No. 2021557219, dated Sep. 27, 2022, 2 pages of office action and 3 pages of translation available.
(Continued)

*Primary Examiner* — Anez C Ebrahim
(74) *Attorney, Agent, or Firm* — Nokia Technologies Oy

(57) ABSTRACT

Systems, methods, apparatuses, and computer program products for configuring and/or transmitting positioning reference signals (PRS) are provided. One method may include providing, to a user equipment, configuration information (306) for determining reference points for positioning measurements (308) or for user equipment assistance
(Continued)

measurements. The assistance information indicates a grouping of downlink reference signals for measurements and reporting.

17 Claims, 19 Drawing Sheets

(56) References Cited

U.S. PATENT DOCUMENTS

| | | | |
|---|---|---|---|
| 2017/0331577 A1 | 11/2017 | Parkvall et al. | |
| 2017/0366244 A1 | 12/2017 | Lee et al. | |
| 2017/0374637 A1 | 12/2017 | Akkarakaran et al. | |
| 2019/0044677 A1 | 2/2019 | Ly | |
| 2019/0306767 A1* | 10/2019 | Martin | H04W 24/10 |
| 2020/0267683 A1* | 8/2020 | Edge | H04W 64/00 |
| 2020/0404642 A1* | 12/2020 | Zhu | H04W 56/001 |

OTHER PUBLICATIONS

"Potential Positioning Techniques—DL based solutions", 3GPP TSG RAN WG1 Meeting #AH-1901, R1-1901022, Agenda: 7.2.10.1.1, Nokia, Jan. 21-25, 2019, 5 pages.

"Measurements for PRS on-demand", 3GPP TSG RAN WG1 #96bis, R1-1905265, Agenda: 7.2.10.4, Nokia, Apr. 8-12, 2019, 3 pages.

International Search Report and Written Opinion received for corresponding Patent Cooperation Treaty Application No. PCT/FI2020/050175, dated Jun. 24, 2020, 17 pages.

"DL based NR positioning", 3GPP TSG RAN WG1 #96, R1-1901847, Agenda: 7.2.10.1.1, Nokia, Feb. 25-Mar. 1, 2019, 5 pages.

Extended European Search Report received for corresponding European Patent Application No. 20776425.9, dated Nov. 30, 2022, 11 pages.

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15)", 3GPP TS 36.305, V15.2.0, Dec. 2018, pp. 1-88.

"3rd Generation Partnership Project; Technical Specification Group Radio Access Network; Evolved Universal Terrestrial Radio Access (E-UTRA); LTE Positioning Protocol (LPP) (Release 15)", 3GPP TS 36.355, V15.2.0, Dec. 2018, pp. 1-220.

Office Action received for corresponding Chinese Patent Application No. 202080024299.8, dated Feb. 29, 2024, 10 pages of Office Action and 4 pages of summary and translation available.

Office Action received for corresponding Chinese Patent Application No. 202080024299.8, dated May 16, 2024, 6 pages of Office Action and 9 pages of summary and translation available.

Office Action received for corresponding Chinese Patent Application No. 202080024299.8, dated Sep. 20, 2024, 6 pages of Office Action and 4 pages of translation/summary available.

"Introduction of Transmission Points for OTDOA in Shared Cell-ID Scenario and PRS-based Terrestrial Beacon Systems", 3GPP TSG-RAN WG2 Meeting #95bis, R2-166147, Qualcomm Incorporated, Oct. 10-14, 2016, pp. 1-20.

Xuebin, "Brief Introduction of UE Positioning in 4G Mobile Communication Systems", Journal of Computer & Telecommunication, Aug., 2015, 4 pages.

Srinivasan et al., "PRS Muting Pattern Assignment to Optimize RSTD Measurement Acquisition for OTDOA Positioning in 3GPP LTE", Proceedings of the International Technical Meeting of The Institute of Navigation, Jan. 26-28, 2015, 2 pages.

* cited by examiner

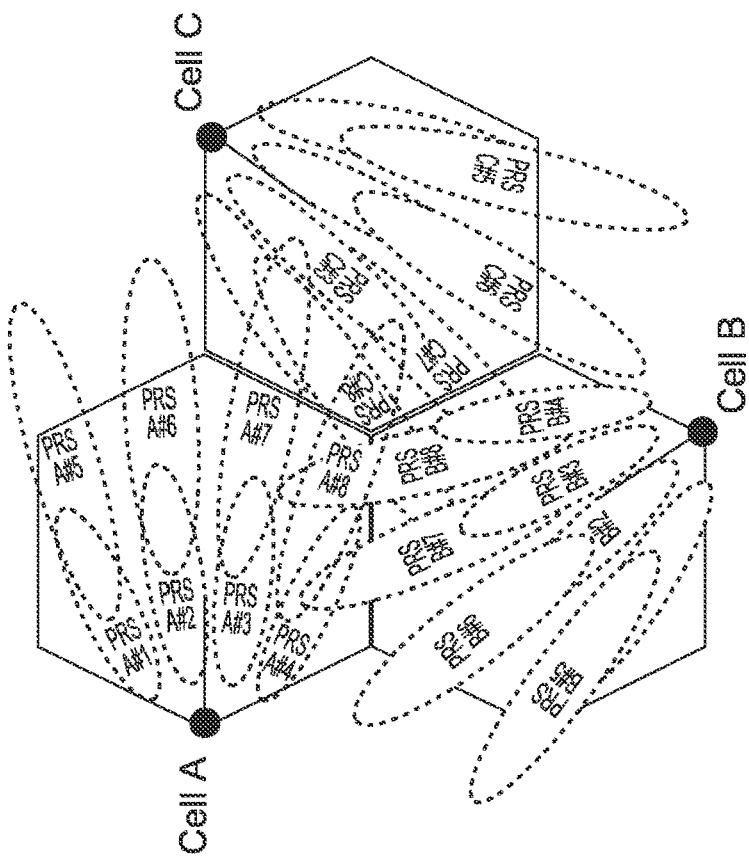
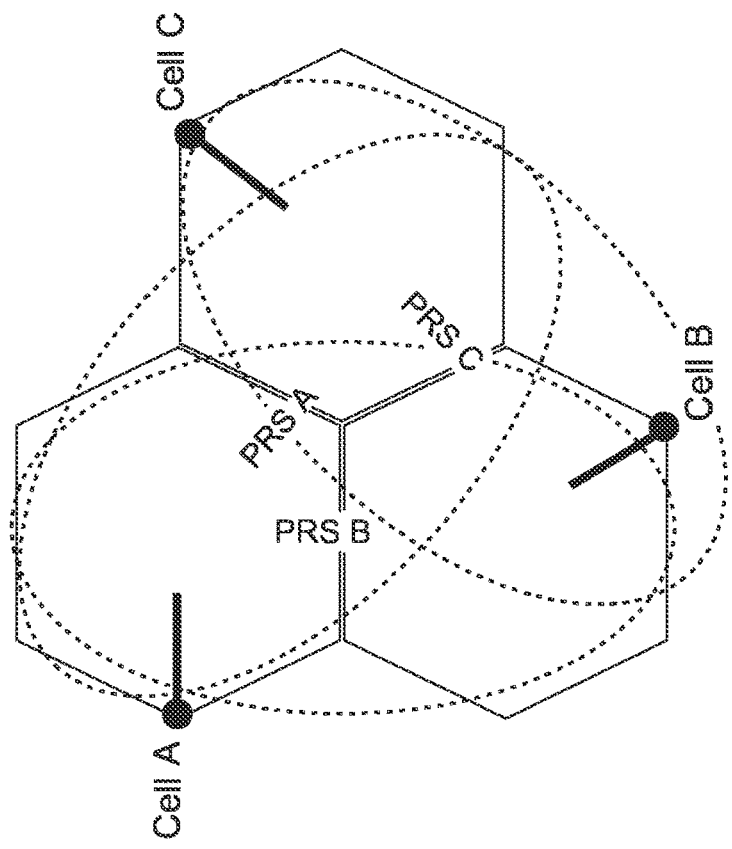
Fig. 1

```
RequestCapabilities ::= SEQUENCE {
    criticalExtensions              CHOICE {
        c1                              CHOICE {
            requestCapabilities-r9          RequestCapabilities-r9-IEs,
            spare3 NULL, spare2 NULL, spare1 NULL
        },
        criticalExtensionsFuture SEQUENCE {}
    }
}

RequestCapabilities-r9-IEs ::= SEQUENCE {
    commonIEsRequestCapabilities        CommonIEsRequestCapabilities       OPTIONAL,  -- Need ON
    a-gnss-RequestCapabilities          A-GNSS-RequestCapabilities         OPTIONAL,  -- Need ON
    otdoa-RequestCapabilities           OTDOA-RequestCapabilities          OPTIONAL,  -- Need ON
    ecid-RequestCapabilities            ECID-RequestCapabilities           OPTIONAL,  -- Need ON
    epdu-RequestCapabilities            EPDU-Sequence                      OPTIONAL,  -- Need ON
    ...,
    [[  sensor-RequestCapabilities-r13      Sensor-RequestCapabilities-r13     OPTIONAL,  -- Need ON
        tbs-RequestCapabilities-r13         TBS-RequestCapabilities-r13        OPTIONAL,  -- Need ON
        wlan-RequestCapabilities-r13        WLAN-RequestCapabilities-r13       OPTIONAL,  -- Need ON
        bt-RequestCapabilities-r13          BT-RequestCapabilities-r13         OPTIONAL   -- Need ON
    ]]
}

OTDOA-RequestCapabilities ::= SEQUENCE {
    ...
}

-- ASN1STOP
```

Fig. 7

```
ProvideCapabilities ::= SEQUENCE {
    criticalExtensions           CHOICE {
        c1                           CHOICE {
            provideCapabilities-r9       ProvideCapabilities-r9-IEs,
            spare3 NULL, spare2 NULL, spare1 NULL
        },
        criticalExtensionsFuture     SEQUENCE {}
    }
}

ProvideCapabilities-r9-IEs ::= SEQUENCE {
    commonIEsProvideCapabilities     CommonIEsProvideCapabilities
    a-gnss-ProvideCapabilities       A-GNSS-ProvideCapabilities       OPTIONAL,
    otdoa-ProvideCapabilities        OTDOA-ProvideCapabilities        OPTIONAL,
    ecid-ProvideCapabilities         ECID-ProvideCapabilities         OPTIONAL,
    epdu-ProvideCapabilities         EPDU-Sequence
    ...,
    [[  sensor-ProvideCapabilities-r13   Sensor-ProvideCapabilities-r13   OPTIONAL,
        tbs-ProvideCapabilities-r13      TBS-ProvideCapabilities-r13      OPTIONAL,
        wlan-ProvideCapabilities-r13     WLAN-ProvideCapabilities-r13     OPTIONAL,
        bt-ProvideCapabilities-r13       BT-ProvideCapabilities-r13       OPTIONAL
    ]]
}
```

Fig. 8a

```
OTDOA-provideCapabilities ::= SEQUENCE {
    otdoa-Mode          BIT STRING {    ue-assisted                 (0),
                                        ue-assisted-NB-r14          (1),
                                        ue-assisted-NB-TDD-r15      (2) } (SIZE (1..8)),
    ...,
    supportedBandListEUTRA                      SEQUENCE (SIZE (1..maxBands)) OF SupportedBandEUTRA       OPTIONAL,
    supportedBandListEUTRA-v9a0                 SEQUENCE (SIZE (1..maxBands)) OF SupportedBandEUTRA-v9a0  OPTIONAL,
    interFreqRSTDmeasurement-r10                ENUMERATED { supported }                                  OPTIONAL,
    additionalNeighbourCellInfoList-r10         ENUMERATED { supported }                                  OPTIONAL,
    prs-id-r14                                  ENUMERATED { supported }                                  OPTIONAL,
    tp-separation-via-muting-r14                ENUMERATED { supported }                                  OPTIONAL,
    additional-prs-config-r14                   ENUMERATED { supported }                                  OPTIONAL,
    prs-based-tbs-r14                           ENUMERATED { supported }                                  OPTIONAL,
    additionalPathsReport-r14                   ENUMERATED { supported }                                  OPTIONAL,
    densePrsConfig-r14                          ENUMERATED { supported }                                  OPTIONAL,
    maxSupportedPrsBandwidth-r14                ENUMERATED { n6, n15, n25, n50, n75, n100, ... }          OPTIONAL,
    prsOccGroup-r14                             ENUMERATED { supported }                                  OPTIONAL,
    prsFrequencyHopping-r14                     ENUMERATED { supported }                                  OPTIONAL,
    maxSupportedPrsConfigs-r14                  ENUMERATED { c2, c3 }                                     OPTIONAL,
    periodicalReporting-r14                     ENUMERATED { supported }                                  OPTIONAL,
    multiPrsNbrs-r14                            ENUMERATED { supported }                                  OPTIONAL,
    idleStateForMeasurements-r14                ENUMERATED { required }                                   OPTIONAL,
    numberOfRxantennas-r14                      ENUMERATED { rx1, ... }                                   OPTIONAL,
    motionMeasurements-r15                      ENUMERATED { supported }                                  OPTIONAL,
    interRAT-RSTDmeasurement-r15                ENUMERATED { supported }                                  OPTIONAL,
    ...
}

-- ASN1STOP
```

Fig. 8b

```
RequestAssistanceData ::= SEQUENCE {
    criticalExtensions           CHOICE {
        c1                           CHOICE {
            requestAssistanceData-r9     RequestAssistanceData-r9-IEs,
            spare3 NULL, spare2 NULL, spare1 NULL
        },
        criticalExtensionsFuture  SEQUENCE {}
    }
}

RequestAssistanceData-r9-IEs ::= SEQUENCE {
    commonIEsRequestAssistanceData       CommonIEsRequestAssistanceData            OPTIONAL,
    a-gnss-RequestAssistanceData         A-GNSS-RequestAssistanceData              OPTIONAL,
    otdoa-RequestAssistanceData          OTDOA-RequestAssistanceData               OPTIONAL,
    epdu-RequestAssistanceData           EPDU-Sequence                             OPTIONAL,
    ...,
    [[
        sensor-RequestAssistanceData-r14     Sensor-RequestAssistanceData-r14      OPTIONAL,
        tbs-RequestAssistanceData-r14        TBS-RequestAssistanceData-r14         OPTIONAL,
        wlan-RequestAssistanceData-r14       WLAN-RequestAssistanceData-r14        OPTIONAL
    ]]
}

OTDOA-RequestAssistanceData ::= SEQUENCE {
    physCellId                    INTEGER (0..503),
    ...,
    [[
        adType-r14                    BIT STRING { prs (0), nprs (1) } (SIZE (1..8))    OPTIONAL
    ]],
    [[
        nrPhysCellId-r15              INTEGER (0..1007)                                 OPTIONAL
    ]]
}
```

Fig. 9

```
OTDOAInformationRequest ::= SEQUENCE {
    protocolIEs         ProtocolIE-Container     {{OTDOAInformationRequest-IEs}},
    ...
}

OTDOAInformationRequest-IEs LPPA-PROTOCOL-IES ::= {
    { ID id-OTDOA-Information-Type-Group     CRITICALITY reject     TYPE OTDOA-Information-Type     PRESENCE mandatory},
    ...
}

OTDOA-Information-Type ::= SEQUENCE (SIZE (1..maxnoOTDOAtypes)) OF ProtocolIE-Single-Container {{ OTDOA-Information-TypeIEs} }

OTDOA-Information-TypeIEs LPPA-PROTOCOL-IES ::= {
    { ID id-OTDOA-Information-Type-Item     CRITICALITY reject     TYPE OTDOA-Information-Type-Item     PRESENCE mandatory},
    ...
}

OTDOA-Information-Type-Item ::= SEQUENCE {
    oTDOA-Information-Type-Item     OTDOA-Information-Item,
    iE-Extensions                   ProtocolExtensionContainer {{ OTDOA-Information-Type-ItemExtIEs} } OPTIONAL,
    ...
}

OTDOA-Information-Type-ItemExtIEs LPPA-PROTOCOL-EXTENSION ::= {
    ...
}
```

Fig. 10

```
OTDOAInformationResponse ::= SEQUENCE {
    protocolIEs         ProtocolIE-Container    {{OTDOAInformationResponse-IEs}},
    ...
}

OTDOAInformationResponse-IEs LPPA-PROTOCOL-IES ::= {
    { ID id-OTDOACells              CRITICALITY ignore  TYPE OTDOACells              PRESENCE mandatory}|
    { ID id-CriticalityDiagnostics  CRITICALITY ignore  TYPE CriticalityDiagnostics  PRESENCE optional}|
    { ID id-AddOTDOACells           CRITICALITY ignore  TYPE Add-OTDOACells          PRESENCE optional},
    ...
}
```

Fig. 11

```
OTDOA-ProvideAssistanceData ::= SEQUENCE {
    otdoa-ReferenceCellInfo              OTDOA-ReferenceCellInfo              OPTIONAL,    -- Need ON
    otdoa-NeighbourCellInfo              OTDOA-NeighbourCellInfoList          OPTIONAL,    -- Need ON
    otdoa-Error                          OTDOA-Error                          OPTIONAL,    -- Need ON
    ...,
    [[
    otdoa-ReferenceCellInfoNB-r14        OTDOA-ReferenceCellInfoNB-r14        OPTIONAL,    -- Need ON
    otdoa-NeighbourCellInfoNB-r14        OTDOA-NeighbourCellInfoListNB-r14    OPTIONAL     -- Need ON
    ]]
}

-- ASN1STOP
```

Fig. 12a

```
OTDOA-ProvideAssistanceData ::= SEQUENCE {
    otdoa-ReferenceCellInfo         OTDOA-ReferenceCellInfo         OPTIONAL,       -- Need ON
    otdoa-NeighbourCellInfo         OTDOA-NeighbourCellInfoList     OPTIONAL,       -- Need ON
    otdoa-Error                     OTDOA-Error                     OPTIONAL,       -- Need ON
    ...,
    [[ otdoa-ReferenceCellInfoNB-r14    OTDOA-ReferenceCellInfoNB-r14   OPTIONAL,   -- Need ON
       otdoa-NeighbourCellInfoNB-r14   OTDOA-NeighbourCellInfoListNB-r14 OPTIONAL -- Need ON
    ]]
}

OTDOA-ReferenceCellInfo ::= SEQUENCE {
    physCellId                      INTEGER (0..503),
    cellGlobalId                    ECGI                            OPTIONAL,       -- Need ON
    earfcnRef                       ARFCN-ValueEUTRA                OPTIONAL,       -- Cond NotSameAsServ0
    antennaPortConfig               ENUMERATED {ports1-or-2, ports4, ...} OPTIONAL, -- Cond NotSameAsServ1
    cpLength                        ENUMERATED { normal, extended, ... },
    prsInfo                         PRS-Info                        OPTIONAL,       -- Cond PRS
    ...,
    [[ earfcnRef-v9a0               ARFCN-ValueEUTRA-v9a0           OPTIONAL,       -- Cond NotSameAsServ2
    ]],
    [[ tpId-r14                     INTEGER (0..4095)               OPTIONAL,       -- Need ON
    ]],
    [[ cpLengthCRS-r14              ENUMERATED { normal, extended, ... } OPTIONAL,  -- Cond CRS
       sameMBSFNconfigRef-r14       BOOLEAN                         OPTIONAL,       -- Need ON
    ]],
    [[ dlBandwidth-r14              ENUMERATED {n6, n15, n25, n50, n75, n100} OPTIONAL, -- Need ON
       addPRSConfigRef-r14          SEQUENCE (SIZE (1..maxAddPRSConfig-r14)) OF PRS-Info OPTIONAL
    ]],
    [[ nr-LTE-SFN-Offset-r15        INTEGER (0..1023)               OPTIONAL,       -- Cond NR
    ]],
    [[ tdd-config-v1520             TDD-Config-v1520                OPTIONAL,
       nr-LTE-fineTiming-Offset-r15 INTEGER (0..19)                 OPTIONAL        -- Cond FineOffset
    ]]
} maxAddPRSConfig-r14                 INTEGER ::= 2
```

Fig. 12b

```
RequestLocationInformation ::= SEQUENCE {
    criticalExtensions         CHOICE {
        c1                         CHOICE {
            requestLocationInformation-r9    RequestLocationInformation-r9-IEs,
            spare3 NULL, spare2 NULL, spare1 NULL
        },
        criticalExtensionsFuture   SEQUENCE {}
    }
}

RequestLocationInformation-r9-IEs ::= SEQUENCE {
    commonIEsRequestLocationInformation            CommonIEsRequestLocationInformation        OPTIONAL,  -- Need ON
    a-gnss-RequestLocationInformation  A-GNSS-RequestLocationInformation OPTIONAL,  -- Need ON
    otdoa-RequestLocationInformation   OTDOA-RequestLocationInformation OPTIONAL,  -- Need ON
    ecid-RequestLocationInformation    ECID-RequestLocationInformation             OPTIONAL,  -- Need ON
    epdu-RequestLocationInformation    EPDU-Sequence                                OPTIONAL,  -- Need ON
    ...,
    [[
    sensor-RequestLocationInformation-r13          Sensor-RequestLocationInformation-r13
        OPTIONAL,       -- Need ON
    tbs-RequestLocationInformation-r13 TBS-RequestLocationInformation-r13   -- Need ON
    wlan-RequestLocationInformation-r13 WLAN-RequestLocationInformation-r13       OPTIONAL,     -- Need ON
    bt-RequestLocationInformation-r13  BT-RequestLocationInformation-r13 OPTIONAL    -- Need ON
    ]]
}
```

Fig. 13

```
ProvideLocationInformation ::= SEQUENCE {
    criticalExtensions          CHOICE {
        c1                          CHOICE {
            provideLocationInformation-r9       ProvideLocationInformation-r9-IEs,
            spare3 NULL, spare2 NULL, spare1 NULL
        },
        criticalExtensionsFuture    SEQUENCE {}
    }
}

ProvideLocationInformation-r9-IEs ::= SEQUENCE {
    commonIEsProvideLocationInformation     CommonIEsProvideLocationInformation     OPTIONAL,
    a-gnss-ProvideLocationInformation       A-GNSS-ProvideLocationInformation       OPTIONAL,
    otdoa-ProvideLocationInformation        OTDOA-ProvideLocationInformation        OPTIONAL,
    ecid-ProvideLocationInformation         ECID-ProvideLocationInformation         OPTIONAL,
    epdu-ProvideLocationInformation         EPDU-Sequence                           OPTIONAL,
    ...,
    [[
    sensor-ProvideLocationInformation-r13   Sensor-ProvideLocationInformation-r13   OPTIONAL,
    tbs-ProvideLocationInformation-r13      TBS-ProvideLocationInformation-r13      OPTIONAL,
    wlan-ProvideLocationInformation-r13     WLAN-ProvideLocationInformation-r13     OPTIONAL,
    bt-ProvideLocationInformation-r13       BT-ProvideLocationInformation-r13       OPTIONAL
    ]]
}

OTDOA-ProvideLocationInformation ::= SEQUENCE {
    otdoaSignalMeasurementInformation       OTDOA-SignalMeasurementInformation      OPTIONAL,
    otdoa-Error                             OTDOA-Error                             OPTIONAL,
    ...,
    [[
    otdoaSignalMeasurementInformation-NB-r14    OTDOA-SignalMeasurementInformation-NB-r14
    ]]
}
```

Fig. 14

MEASUREMENTS FOR ON-DEMAND POSITIONING REFERENCE SIGNAL TRANSMISSION

RELATED APPLICATION

This application was originally filed as PCT Application No. PCT/FI2020/050175 on Mar. 19, 2020, which claims priority from U.S. Provisional Application No. 62/823,973, filed on Mar. 26, 2019, which is hereby incorporated in its entirety.

CROSS-REFERENCE TO RELATED APPLICATIONS

This application claims priority from U.S. provisional patent application No. 62/823,973 filed on Mar. 26, 2019. The contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods configuring and/or transmitting positioning reference signals (PRS) in communications systems, such as NR.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

An embodiment may be directed to a method that may be implemented by a network node. The method may include providing, to a UE, configuration information (e.g., network assistance information) for determining reference points for positioning measurements or for UE assistance measurements. The assistance information may indicate a grouping of downlink reference signals for measurements and reporting.

Another embodiment may be directed to an apparatus including at least one processor and at least one memory comprising computer program code. The at least one memory and computer program code may be configured, with the at least one processor, to cause the apparatus at least to provide, to a UE, configuration information for determining reference points for positioning measurements or for UE assistance measurements. The assistance information may indicate a grouping of downlink reference signals for measurements and reporting.

In an embodiment, specific signals in a group may be considered as one reference point for location measurement using PRS or for assistance measurement for configuration of PRS.

In an embodiment, the grouping of the downlink reference signals may be used for at least one of the following: before the PRS are configured for the UE so that when the UE performs assistance measurements for PRS configuration it determines measurements and reporting based on the grouping information provided by network, or after UE has received the configuration for PRS to perform positioning measurements on the PRS it uses the group information when determining which signals to use for the PRS measurement and how to report the results.

In an embodiment, the measurements include UE assistance measurements on SSB/CSI-RS/L3 CSI-RS or PRS for UE location measurements.

In an embodiment, the grouping of signals may be done for PRS signals or for DL RS (SSB/CSIRS), and association between PRS and DL RS may be provided by network.

In an embodiment, the method may further include configuring the UE with one or more measurement reporting thresholds. In some variants, the measurement reporting threshold(s) may be based on RSRP, SINR, and/or RSRQ.

In an embodiment, the method may further include receiving, from the UE, a report of the measurements on PRS of the N-highest quality beam(s), e.g., based on RSRP, SINR, and/or RSRQ, that are above the measurement reporting threshold(s).

In an embodiment, the method may further include receiving, from the UE, a report of the measurements on PRS of the beam with highest RSRP on each group or in each cell or in a reference point. In a variant, the measurements on PRS may include RSTD reference signal time difference between different reference points.

In an embodiment, the method may further include, when performing group-based measurements on PRS for positioning purposes, receiving, from the UE, a report of the measurements on PRS of the beam with highest RSRP on each group or reference point. In a variant, the measurement on PRS may include RSTD reference signal time difference between different reference points or groups.

In an embodiment, the method may further include, when performing group-based measurements for assistance purposes, receiving, from the UE, a report of the beam or N beams with highest RSRP on each group or reference point.

In an embodiment, the method may further include modifying the LPP to include signaling exchange between a LMF and the UE. In a variant, this new signaling may include the (new) UE measurements, as these are configured by the network, reported to the LMF, along with the corresponding request capabilities signaled from the LMF to the UE.

In an embodiment, the method may further include modifying the NRPPa to include signaling exchange between the LMF and the NG_RAN. In a variant, this new signaling may include the (new) OTDOA information request signaled from the LMF to the NG_RAN, as well as the OTDOA information response signaled from NG_RAN to the LMF.

Another embodiment may be directed to a method that may be implemented by a UE. The method may include receiving, from a network, configuration for performing positioning-specific assistance measurements, and reporting the measurements to the network. The configuration for the positioning assistance measurements may include at least one of: positioning-report-specific threshold for determining if a beam quality (SSB/CSIRS/CSI_RS_L3) is suitable to be reported in assistance report, or signal type specific threshold, where the threshold is specific for signal type.

Another embodiment may be directed to an apparatus including at least one processor and at least one memory comprising computer program code. The at least one memory and computer program code may be configured, with the at least one processor, to cause the apparatus at least to receive, from a network, configuration for performing positioning-specific assistance measurements, and to report the measurements to the network. The configuration for the positioning assistance measurements may include at least one of: positioning-report-specific threshold for determining if a beam quality (SSB/CSIRS/CSI_RS_L3) is suitable to be reported in assistance report, or signal type specific threshold, where the threshold is specific for signal type.

In an embodiment, the signal type may include, for example, SSB signal/CSI-RS for beam management/CSI-RS for L3 mobility.

In an embodiment, the receiving may include receiving the configuration in a request capabilities message or a new request measurements message received from a LMF.

In an embodiment, the reporting may include reporting the measurements in a provide capabilities message or a new provide measurements message.

In an embodiment, the reporting may include transmitting a measurement report that includes at most N-highest quality beams above a threshold or thresholds and/or up to M cells/transmission points.

In an embodiment, upon receiving the configuration, the method may further include generating the assistance measurement reporting when at least one of the following conditions are fulfilled: immediately when M number of cells or reference points are available or after a time offset. In a variant, the availability of cells may mean that at least one or X candidates are detected above a configured threshold. In one example, M may be 3, for example. In a variant, a timer may be started when the assistance measurement request is received. In one example, the timer may expire when measurement reporting criteria is triggered as above and, when the timer expires and the UE has detected less than M cells or reference points to be available, the UE may report the subset of cell and beams.

In an embodiment, the UE may have specific reporting configuration for reporting and measurement of specific beam types depending on the configured threshold or thresholds. In one example, the beams may be reported with the following priority when applicable for serving or neighbor cells: (1) radio link monitoring RS, (2) beam failure detection RS, (3) TCI States for PDCCH (CSI-RS for beam management /SSB), (4) TCI States for PDSCH (CSI-RS for beam management /SSB), (5) CSI-RS for L3 mobility, and (6) SSB. In a further variant, if signal type (SSB/CSI-RS/CSI-RS for L3) specific thresholds are configured, then the ones with threshold values are prioritized. Alternatively, in another variant, only signals with thresholds are considered in reporting.

In an embodiment, when the UE performs assistance measurements on either SSB/CSI-RS/CSI-RS for L3 mobility beam specific reporting of measurement results, the method may include reporting in beam or panel specific manner including panel/beam ID in the reported beam measurements.

BRIEF DESCRIPTION OF THE DRAWINGS

For proper understanding of example embodiments, reference should be made to the accompanying drawings, wherein:

FIG. 1 illustrates an example of a schematic diagram of the PRS transmission in LTE and NR, respectively;

FIG. 7 illustrates an example of a request capabilities message structure, according to one embodiment;

FIGS. 8a illustrates an example of a provide capabilities message structure, according to an embodiment;

Figure 15:
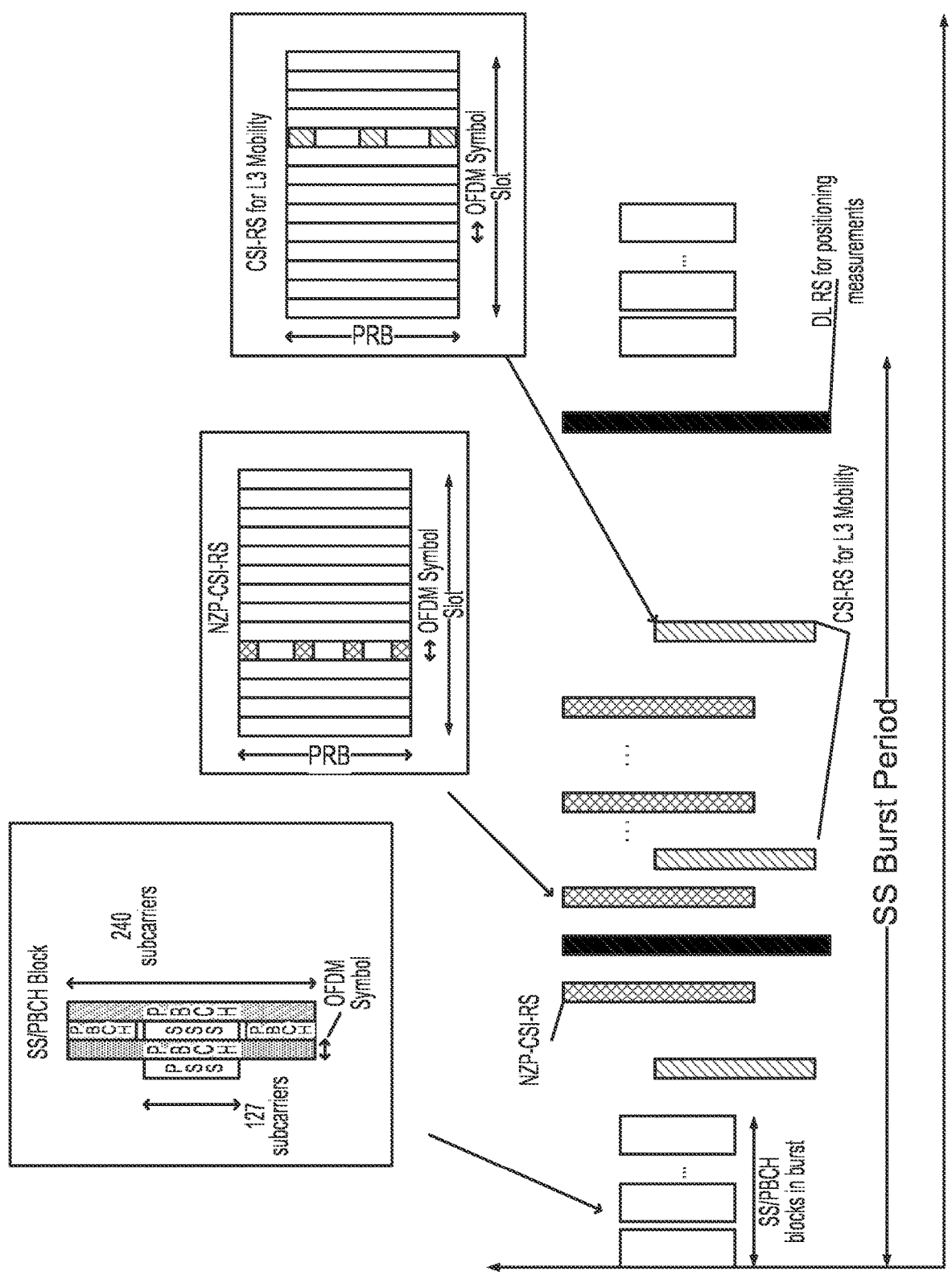
Figure 16:
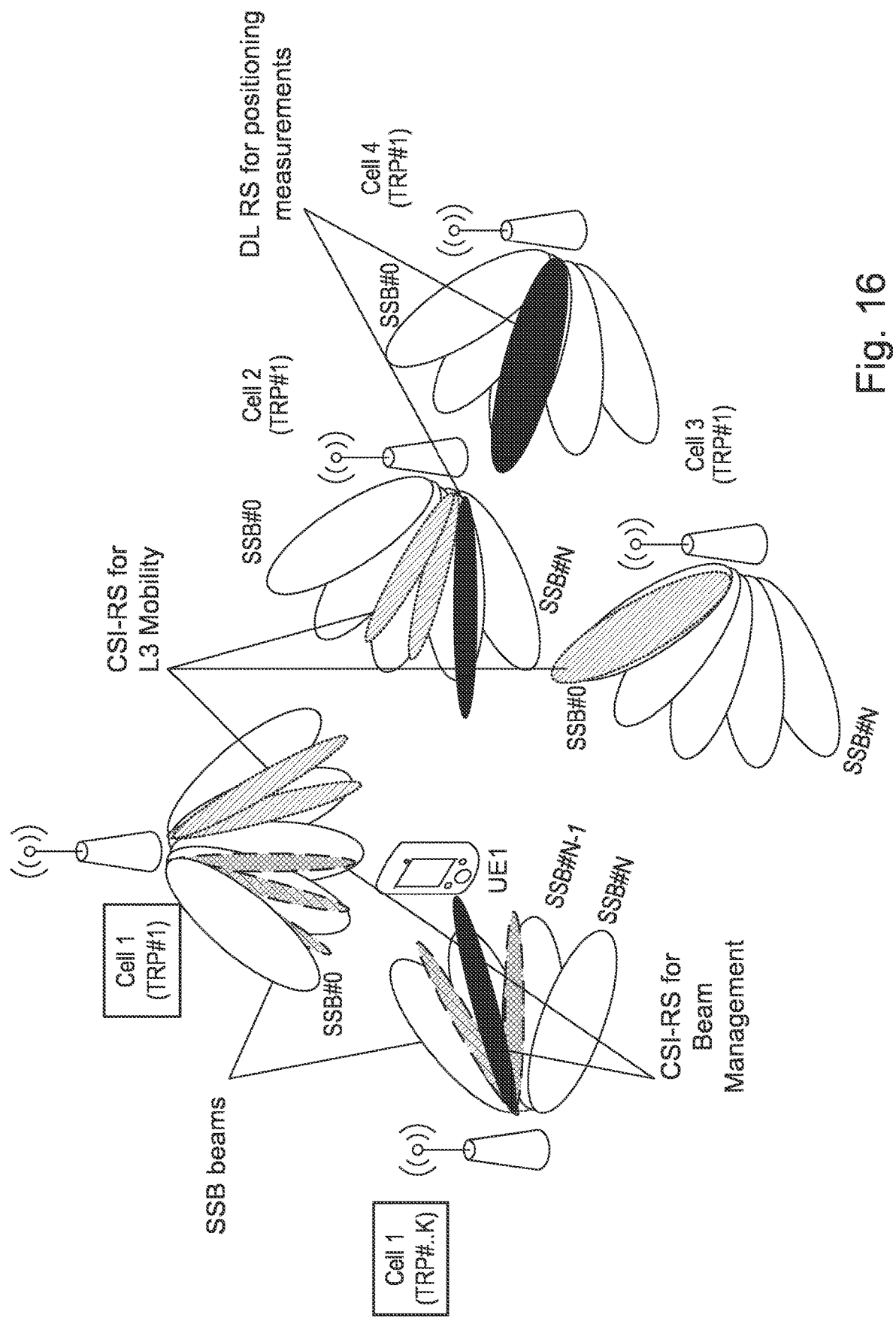

8b illustrates an example of a continuation of the provide capabilities message structure, according to an embodiment;

FIG. 9 illustrates an example of a request assistance data message structure, according to an embodiment;

FIG. 10 illustrates an example of a OTDOA information request message structure, according to an embodiment;

FIG. 11 illustrates an example of the OTDOA information response message structure, according to one embodiment;

FIGS. 12a illustrates an example of a provide assistance data message structure, according to one embodiment;

12b illustrates an example of a continuation of the provide assistance data message structure, according to one embodiment;

FIG. 13 illustrates an example of the request location information message structure, according to one embodiment;

FIG. 14 illustrates an example of the request location information message structure, according to an embodiment;

FIG. 15 illustrates one example of a time frequency mapping of downlink reference signals, according to some embodiments; and FIG. 16 illustrates one example of a deployment of a beam based system, according to some embodiments.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for configuring and/or transmitting positioning reference signals (PRS), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain embodiments may relate to configuring and transmitting PRS. The PRS may be transmitted by the network such that the UEs can measure them and report the outcome of such measurements back to the network. Based on such reports, the position of the UE can be estimated. One technique associated with the use of PRS is the observed time difference of arrival (OTDOA).

In LTE, the PRS are transmitted according to antenna configuration where for example an omni directional antenna will transmit PRS to all directions and sectorized antenna to direction of antenna boresight with a sector-shaped radiation pattern. A main factor that differentiates the transmission of PRS in NR from that of LTE, is that beamforming is involved. This particularly applies to Frequency Range 2 (FR2), where a large number of beams is anticipated to be transmitted per cell and/or transmission point. As a result, the transmission of PRS in NR is not a straightforward extension of the LTE case.

In NR, when a cell is covered using multiple beams and particularly in FR2 (but also in FR1), the PRS needs to be transmitted in a beamformed fashion to compensate the higher path loss at higher carrier frequencies. Therefore, beam sweeping procedures need to be followed, such as SS/PBCH, System Information (SI) or paging. Transmitting PRS in a beam-sweeping manner results in an inefficient use of the downlink resources, since not all beams are relevant nor detectable by the respective UE for positioning measurements. In other words, one problem associated with a pure beam-sweeped PRS is inefficiency. That is, by merely adopting the PRS transmission from LTE to NR FR2, the PRS transmission to all beam sweeping directions results in an unnecessary transmission of PRSs.

It should be noted that such inefficiency of PRS transmission is relevant not only from a resource usage point of view, but also from a latency point of view. This is because a reduced number of beam-sweeping for PRS signals can reduce the overall time needed for UEs to measure PRS signals, thereby reducing the overall time of the complete positioning procedure.

FIG. 1 illustrates an example of a schematic diagram of the PRS transmission in NR, along with that of LTE. In the example of FIG. 1, there are eight beams per cell which correspond to a total of eight PRS transmissions per cell. If such PRS transmissions are configured in a static manner, they are transmitted constantly and irrespective of whether there are UEs in the beam area associated with a positioning service. This leads to the inefficiency problem as described above. As will be discussed below, example embodiments provide a solution to at least this problem.

Figure 2:
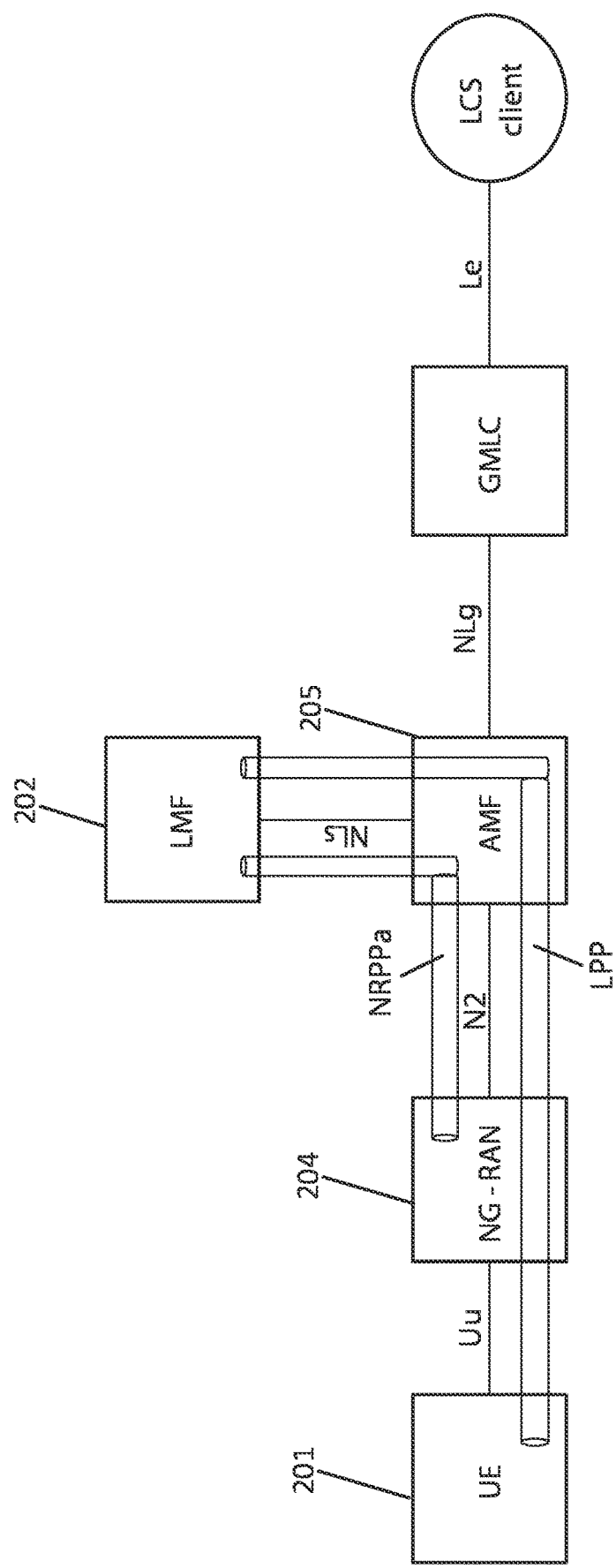
FIG. 2 illustrates an example system diagram, according to an embodiment.

FIG. 2 illustrates an example system diagram, according to an embodiment. As illustrated in the example of FIG. 2, certain embodiments may involve signaling between the UE 201 and location server 202 through the LTE positioning protocol (LPP), via the non-access stratum (NAS). In addition, certain embodiments may involve signaling between the transmission points 204, 205 (both the one that corresponds to the serving cell and the one that corresponds to neighboring cells) and the location server 202 through the new radio positioning protocol annex (NRPPa).

An embodiment provides a method for positioning measurements and related signalling to enable on-demand transmission of PRS signals. PRS signals are associated with a positioning service related to a given UE. In other words, one embodiment provides a targeted transmission of PRS signals in a beamformed fashion on the beams measured and reported by a UE and, particularly, on those beams that the UE can detect with sufficient quality.

Thus, certain embodiments provide at least a solution to the problem of unnecessary PRS transmission in a positioning system based on downlink beam sweeping. An embodiment may involve exploiting the information concerning the assistance measurements provided by UE.

In certain embodiments, a UE may perform positioning-specific assistance measurements, which may be used for on-demand PRS transmission. For example, in an embodiment, a network may configure the UE with a measurement reporting threshold, such as reference signal received power (RSRP). Alternatively or additionally the measurement quantity and the reporting threshold may be e.g. one of signal to interference and noise ratio (SINR), reference signal received quality (RSRQ). Thus beam quality in some of the embodiments herein may refer to RSRP, RSRQ or SINR or the like. According to an embodiment, the measurement reporting threshold may involve different values. This is because, for positioning purposes, it may be desirable that more neighbouring cells are detected in order to allow for enough physical points included in the triangulation process.

According to some embodiments, any beam above (alternatively any threshold comparison in any of the methods may include determining whether a signal quality is equal or above the threshold) the measurement reporting threshold can be considered as candidate to be reported. This results in a positioning-specific reported beams, in the sense that such beams may not be reported for purposes other than positioning. In an embodiment, the UE may be configured to report, at most, the N-highest quality (e.g. based on RSRP, SINR or the like) beams above the threshold and up to M cells or transmission points or reference points. As an example, the reference point can be a physical point or a set of signals that can be considered to be transmitted from a specific/same physical point that is used in the positioning measurement process. N and/or M may be configurable by network. Reference point can also be a TRP (transmission receptions point) and signals transmitted on same TRP can be considered to be transmitted from same physical point from measurement process perspective or set of signals in specific TRP/Cell can be considered as one reference point. Cell may have one more TRPs. Signals transmitted from one TRP could be considered to be co-located. Hence, signals from different TRPs may be considered to be originated from a different physical location.

In a further embodiment, the UE may trigger the assistance measurement report immediately or after a time-offset or when M number of cells/reference points/TRPs are available. The availability of cells/reference points/TRPs can mean that at least one or X candidates are detected above the configured threshold.

According to a further aspect regarding measurements, the UE may have specific reporting configuration for reporting and measurement of specific beam types. As one example, the UE may be configured to measure and report only Synchronization Signal Physical Broadcast Channel Blocks (SS/PBCH or simply 'SSB') beams (e.g., N highest of M cells or reference points). This may be applicable to idle or inactive mode measurements, for instance. As another example, the UE may be configured to measure and report at first the Layer 3 (L3) mobility Channel State Information-Reference Signals (CSI-RS) up to N highest measurement quantity (e.g. RSRP, SINR, RSRQ) beams per cell above threshold. If up to N CSI-RS are not detected, the UE may report SSBs above the threshold so that up to N may reported. In one embodiment, UE reported SSBs may be associated to the already included CSI-RS in the report. UE may prioritize further in reporting the serving cell for example in cases where serving cell would provide multiple potential reference points for positioning measurements.

As yet another example, the UE may measure and report up to N_serving_cell highest CSI-RS signals (these may be either L3 mobility CSI-RS or CSI-RS for beam management such NZP-CSI-RS, non-zero power CSI-RS) and/or SSBs and for non-serving cells up to N beams. When UE determines serving cell beams (e.g. the downlink reference signals) to be reported, the UE may further prioritize signals that are configured as: (1) Radio link monitoring RS, (2) Beam failure detection RS, (3) Transmission Configuration Indication (TCI) States for physical downlink control channel (PDCCH) (CSI-RS for beam management/SSB), (4) TCI States for physical downlink shared channel (PDSCH) (CSI-RS for beam management /SSB), (5) CSI-RS for L3 mobility, and/or (6) SSB. Thus, UE may also prioritize the measurement of these signals.

In an embodiment, as response to the UE measurements, the network may provide the UE with PRS measurement assistance data. According to some embodiments, the PRS measurement assistance data may include the network indicating to the UE the reference beams for PRS transmission, e.g., it may provide association of a specific PRS index and reported DL RS (beam) index. The PRS may be for example associated to specific SSB time location index/SSB index, NZP-CSI-RS resource or resource set ID, CSI-RS Resource ID for L3 Mobility CSI-RS. In certain embodiments, the network may also indicate grouping information for PRS measurement where specific signals in a group can be considered from UE perspective to be one of the reference points for positioning procedure. As an example, a reference point can be one point for PRS based location measurement. As an example, the UE may have reported from a single cell SSB #0-SSB #7 and the network may indicate that group 1 comprises of SSB #0-SSB #3 and group 2 comprises of SSB #4-SSB #7. This would provide the UE information that it can use two reference points/physical points based on signals of one cell or a TRP of a cell. In some embodiments, through the association of PRS signal or signals to specific downlink reference signal (CSI-RS/SSB) or signals the grouping information can be provided and the grouping of PRS signals would be based on the grouping information on the associated signals. In one example, grouping can be e.g. TRP specific or cell specific i.e. down link reference signals transmitted from same TRP/Cell are grouped (and grouping indicated to UE). In another example, grouping information can group signals across TRPs of a cell, TRPs across cells or even cells. The actual TRPs or even cells that are used for grouping may not be visible to UE as UE determines the grouping and associated procedures. However, in some examples, it may be possible to provide indication of, e.g., TRP index and indicate that signal transmitted from a specific TRP index can be considered as a group or reference point.

Association signaling between specific signals and TRP index may be provided by network. Network may provide the grouping for any of the signals described herein for example the CSI-RS (NZP-CSI-RS) for beam management, SSB signals, CSI for L3 mobility or positioning reference signals such as PRS. Grouping may consider only single type of reference signal or in any combination. For example CSI-RS and SSB can be in same group, SSB can be in one group and CSI-RS in another group Alternatively, network may provide the mapping between PRS index and corresponding (e.g., association or association through quasi co-located (QCL) assumption) DL RS (SSB/CSI-RS/L3 CSI-RS). Grouping information can be provided for PRS signals and UE understands the grouping for associated signals. Quasi co-location assumption indicates to UE that signals that are QCL'd or share the QCL'd assumption share the similar properties such as Doppler spread, average delay or spatial RX assumption. Spatial RX assumption or typeD QCL assumption indicates UE that signal can be received using the same RX beam. This is especially used when UE is assumed to use beam forming e.g. in higher frequencies. In lower frequencies where network may use beam forming UE may be assumed to have omni directional reception. For example, these may sometime referred as FR1 (lower frequencies) and FR2 (higher frequencies). It should be noted that any method here in is not specifically limited to any particular operating frequency. As a further example for QCL assumption, following QCL types can indicated to UE in NR:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In one example, the UE may report the PRS measurement of the beam with highest RSRP on each group or in each cell. In one example embodiment the network may provide UE with grouping information prior to the configuration of assistance measurements, in the same or different configuration message of the assistance measurements, or as a response to the reported measurements. Grouping information may also be provided as part of PRS configuration. In one embodiment, UE may utilize grouping information to perform and report positioning measurements on the downlink reference signals such as SSB/CSI-RS/CSI-RS for L3 Mobility. Positioning measurements may be e.g. RSTD. This may be done independently or instead of positioning measurements on PRS signals or used in combination with PRS measurements.

In a further embodiment, when the UE performs measurements on either CSI-RS/SSB/CSI-RS for L3 Mobility or PRS according to example embodiments described herein, the UE may use panel or beam specific reporting. According to an example, the UE may determine the reporting based on spatial filtering; the best PRS_ID with the current RX panel/beam setup (the same direction) is taken into account for the reporting. As an example, best positioning measurement result according to a metric (e.g. RSTD) is selected per antenna panel or beam. Panel information, e.g., panel ID may be included in the assistance measurement report or when reporting positioning measurements, according to some embodiments.

Some embodiments described herein involve transmitting measurements from the UE to a location server, which may be referred to as the Location Management Function (LMF) in NR. According to an embodiment, the measurements conveyed to the LMF may contain information on which beams and from which cells (i.e., both the serving and neighbouring cells) are detectable at the UE. Then, the location server may use this information to inform the respective serving and neighbouring cells (i.e., the cells whose beams are detected) about which of the particular beams can be detected by the given UE (i.e., the UE associated with the positioning service). In certain embodiments, after receiving such information, the respective cells may activate the PRS transmission on-demand for the given UE, and only on the respective beams as indicated by the server. This provides a more refined/targeted PRS transmission in the sense that excessive PRS transmissions are avoided.

Figure 3:
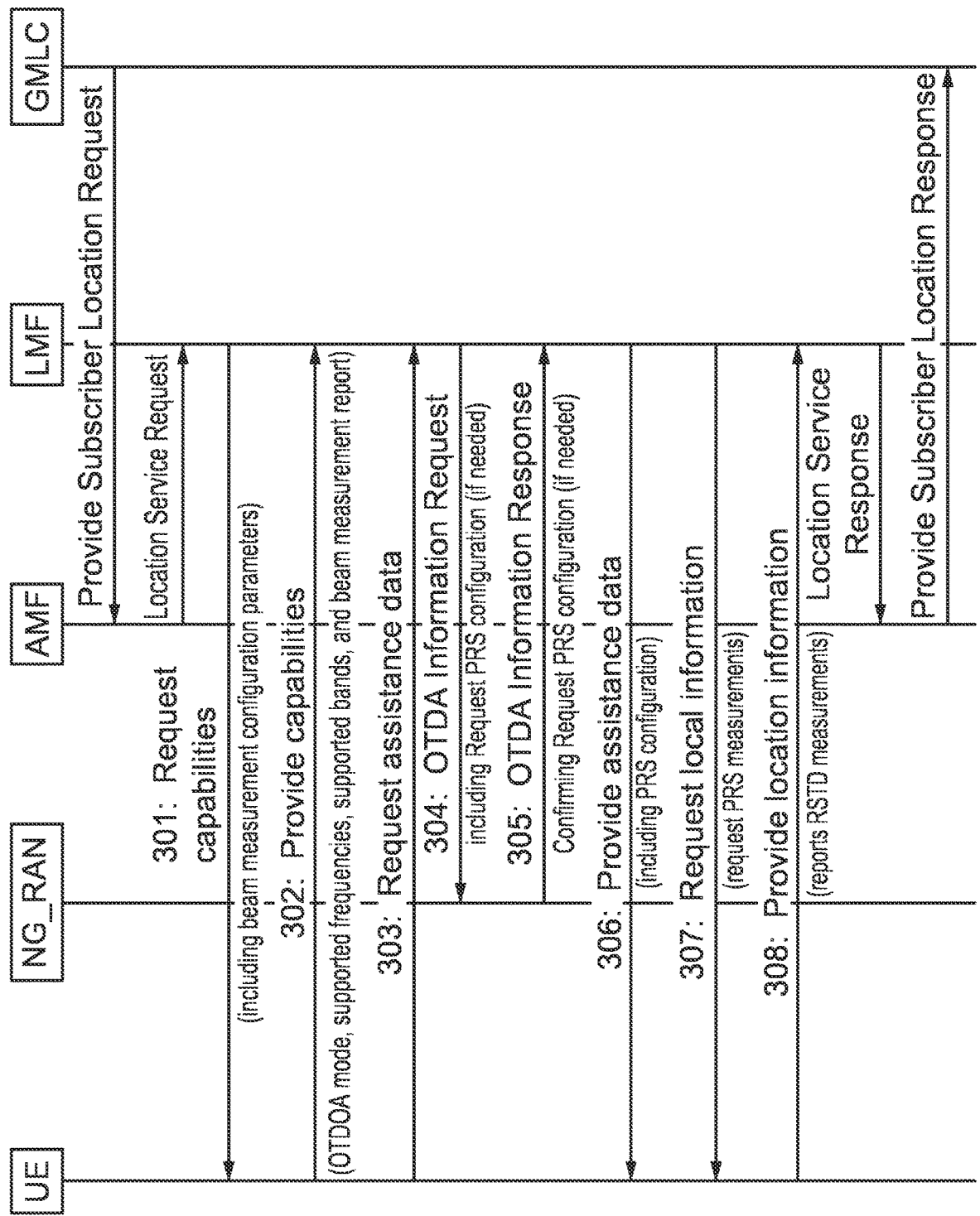
FIG. 3 illustrates an example signaling diagram of a procedure, according to certain embodiments.

FIG. 3 illustrates an example signaling diagram of a procedure, according to certain embodiments. As illustrated in the example of FIG. 3, at 301, the LMF may request beam measurements. For example, each time there is a request by a positioning client to the LMF, for obtaining the location of a given UE, the LMF may request such beam measurements from the respective network entity where such beam measurement report is available. In the example of FIG. 3, the request, including the beam measurement configuration parameters, may be included in the request capabilities message. Alternatively, however, the request may be included in a separate message.

In an embodiment, the request capabilities message body may be a LPP message, and may be used by the location server (LMF) to request target device capability information for LPP and the supported individual positioning methods. FIG. 7 illustrates an example of the request capabilities message structure, according to one embodiment. The request capabilities message may include an otdoa-RequestCapabilities parameter may include the parameters required for the beam measurement configuration (threshold, N, etc . . . ).

Continuing with the example of FIG. 3, at 302, the UE may report beam measurements to LMF, and LMF may identify the reference beams for the PRS transmission. Upon receiving the measurement report by the UE via the LPP protocol, the LMF is able to identify the cell-ID and beam-ID values from serving and neighboring cells that are detectable by the UE. In the example of FIG. 3, these measurements are reported back to the LMF in a provide capabilities message. However, in other embodiments, the measurements may be reported from the UE in a separate message.

The provide capabilities message body may be a LPP message, and may be used to indicate the LPP capabilities of the target device to the location server (LMF). FIGS. 8a and 8b illustrate an example of the provide capabilities message structure, according to an embodiment. In particular, as illustrated in FIG. 8b, a OTDOA-ProvideCapabilities information element (IE) may be used by the target device (e.g., UE) to indicate its capability to support OTDOA and to provide its OTDOA positioning capabilities to the location server (LMF).

As further illustrated in the example of FIG. 3, at 303, the UE may transmit a request assistance data message to the location server (LMF). FIG. 9 illustrates an example of the request assistance data message structure, according to an embodiment. In one example, the request assistance data message may be a LPP message used to request assistance data from the location server. As illustrated in the example of FIG. 9, an OTDOA-RequestAssistanceData IE may be used by the target device (e.g., UE) to request the assistance data from the location server (LMF).

At 304, the LMF may request, from RAN, to transmit PRS on-demand. For example, the information about the detectable cell-ID and beam-ID values at the UE may be used by the LMF to trigger to the RAN an on-demand transmission of PRS. Specifically, the LMF may trigger the following PRS transmission: (i) PRS at the serving beams of the serving cell (e.g., using the above example, the transmission of PRS at beam #8 of cell A); (ii) PRS at all the detectable neighbouring cell-ID and beam-ID (using the same example, a PRS transmission at beam #8 of Cell B and beam #8 of Cell B is triggered). In an embodiment, this request for on-demand triggering of PRS at the RAN may be executed via the NRPPa protocol, e.g., using an OTDOA information request.

FIG. 10 illustrates an example of the OTDOA information request message structure, according to an embodiment. In one example, in case the current PRS configuration needs to be modified, the request to change it may be included in the OTDOA information request message.

According to some embodiments, the involved serving and neighboring cells may send to the LMF, at 305, an acknowledgment confirming the activation of the PRS transmission on the designated beams. In an embodiment, this exchange of signaling may also be carried out through the NRPPa protocol, e.g., using an OTDOA information response. FIG. 11 illustrates an example of the OTDOA information response message structure, according to one embodiment. In one example, in case the current PRS configuration needs to be modified, OTDOA information response message may acknowledge the modification.

As also illustrated in the example of FIG. 3, at 306, the LMF may provide PRS assistance information to the UE. For example, after the PRS are activated, the LMF may inform the UE about which beam-IDs and cell-IDs convey the PRS information that is relevant for this particular UE. It is noted that the PRS signals are in principle not restricted to be measured by just a single UE. For instance, if nearby UEs are requesting a positioning service, then the LMF may provide PRS assistance information to that UE, and such information can be partially or entirely the same.

FIGS. 12a and 12b illustrate an example of the provide assistance data message structure, according to one embodiment. In an embodiment, the message depicted in FIG. 12a may include the PRS configuration (including new PRS if it has been added). In an embodiment, the message depicted in FIG. 12b may optionally link the PRS information to the beam reporting information.

At 307, the LMF may transmit a request location information message to the UE requesting PRS measurements. FIG. 13 illustrates an example of the request location information message structure, according to an embodiment. In one example, the request location information message may be a LPP message that is used by the location server (LMF) to request positioning measurements or a position estimate from the target device (e.g., UE).

According to an embodiment, the UE may then measure and, at 308, report to the LMF the required positioning related measurements. For example, the UE may report the reference signal time difference (RSTD) values between PRS transmissions, using the PRS transmissions on the indicated or configured beams and cells. FIG. 14 illustrates an example of a provide location information message structure, according to an embodiment. The provide location information message may be a LPP message used by the target device (e.g., UE) to provide positioning measurements or position estimates to the location server (LMF). In one example, the OTDOA-ProvideLocationInformation IE may be used by the target device (e.g., UE) to provide OTDOA location measurements to the location server (LMF). In another example, the OTDOA-ProvideLocationInformation IE may also be used to provide an OTDOA positioning specific error reason. According to an embodiment, the provide location information message may include the PRS measurements including ones from additional PRS if they have been added, but the format of the message will remain unchanged.

Figure 4:
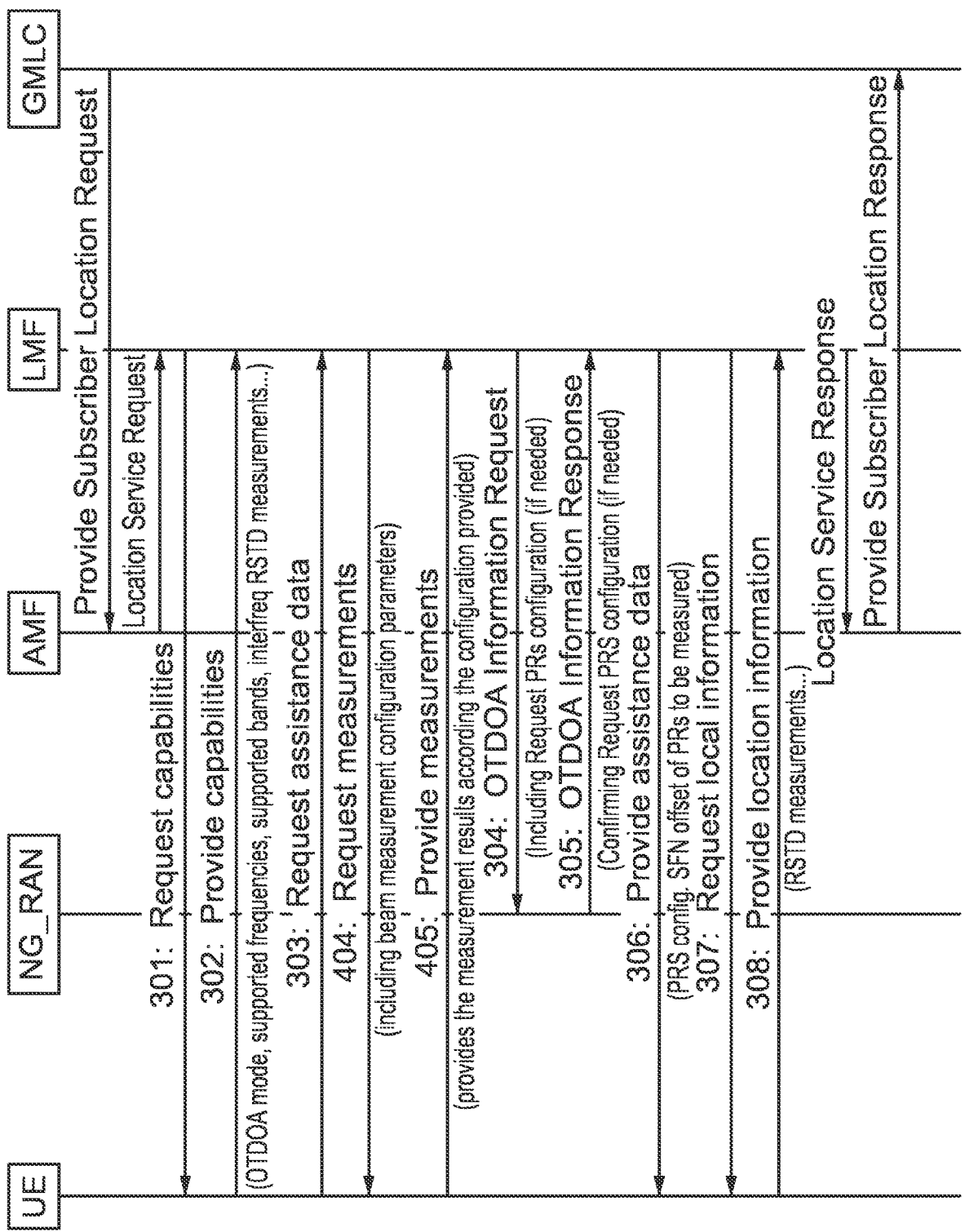
FIG. 4 illustrates an example signaling diagram of a procedure, according to some embodiments.

FIG. 4 illustrates another example signaling diagram of a procedure, according to certain embodiments. The example signaling diagram of FIG. 4 is similar to that of FIG. 3, however the measurement configuration and the corresponding reporting are performed via two new messages—the request measurements message 404 and provide measurements message 405.

FIG. 15 illustrates one example of a time frequency mapping of downlink reference signals, according to some embodiments. FIG. 15 illustrates an example of SS/PBCH or SSB, CSI-RS (NZP-CSI-RS) for beam management, L3 Mobility CSI-RS signals in time—frequency grid. CSI-RS for L3 mobility may be used for performing L3/RRC/Cell mobility measurements where as NZP-CSI-RS may be used for serving cell beam management. SSB measurements may be used for beam management purposes (e.g. L1-RSRP) or for L3 mobility purposes and downlink reference signal for positioning measurement. FIG. 15 is just one example way of mapping the signals in time-frequency grid. Embodiments are not limited to the example of FIG. 15.

FIG. 16 illustrates one example of a deployment of a beam based system, according to some embodiments. FIG. 16 illustrates multi TRP deployment where a single cell can covered using multiple TRPs (cell 1). It also illustrates beam-based transmission of downlink reference signals such as SS/PBCH or SSB, CSI-RS for Beam Management, L3 Mobility CSI-RS and downlink reference signal for positioning measurement (e.g. PRS). Embodiments are not limited to the example of FIG. 16.

Figure 5A:
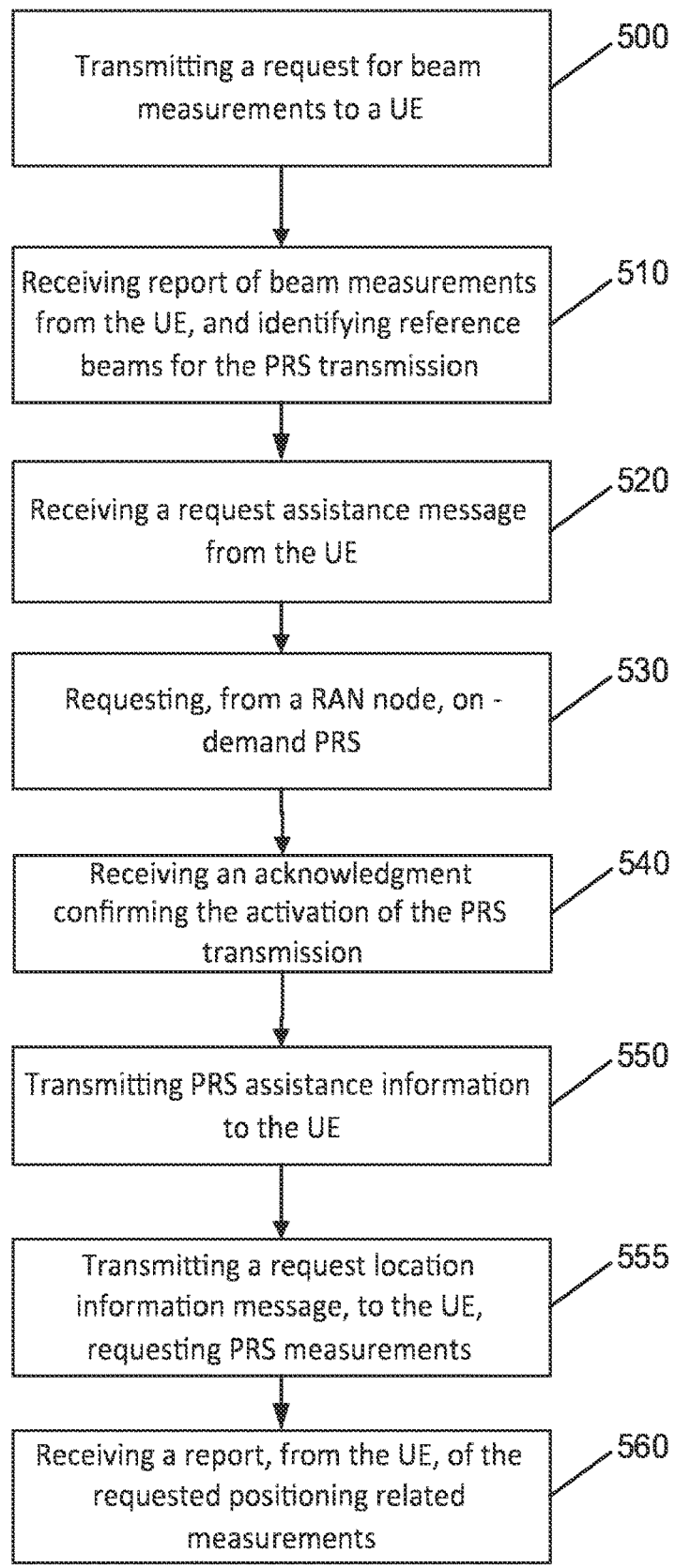
FIG. 5a illustrates an example flow diagram of a method, according to an embodiment.

FIG. 5a illustrates an example flow diagram of a method for configuring and transmitting PRS, according to one embodiment. In certain example embodiments, the flow diagram of FIG. 5a may be performed by a network node serving a cell, such as a base station, node B, eNB, gNB, or any other access node, or one or more servers in a 5GC or cloud configuration, for instance. In one embodiment, for example, the method of FIG. 5a may be performed by a location server, such as a LMF in NR.

As illustrated in the example of FIG. 5a, the method may include, at 500, transmitting a request for beam measurements to a UE. For example, in an embodiment, the request for beam measurements may be transmitted to a given UE when there is a request by a positioning client for obtaining the location of the given UE. In one example, the request may include beam measurement configuration parameters, and may be included in a Request Capabilities message. Alternatively, however, the request may be included in a separate request measurements message.

The method may then include, at 510, receiving a report of beam measurements from the UE, and identifying the reference beams for the PRS transmission. Upon receiving the measurement report from the UE, e.g., via the LPP protocol, the cell-ID and beam-ID values from serving and neighboring cells that are detectable by the UE can be identified. In one example, the receiving 510 may include receiving the beam measurements in a Provide Capabilities message. However, in other embodiments, the measurements may be received in a separate provide measurements message, for example.

The method may also include, at 520, receiving a request assistance message from the UE and, at 530, requesting, from a RAN node, on-demand PRS. For example, the requesting 530 may include using information about the detectable cell-ID and beam-ID values at the UE to trigger to the RAN an on-demand transmission of PRS. More specifically, in an embodiment, the following PRS transmission may be triggered: (i) PRS at the serving beams of the serving cell (e.g., using the above example, the transmission of PRS at beam #8 of cell A); (ii) PRS at all the detectable neighboring cell-ID and beam-ID (using the same example, a PRS transmission at beam #8 of Cell B and beam #8 of Cell B is triggered). In an embodiment, the requesting 530 may include transmitting a request for on-demand triggering of PRS at the RAN via the NRPPa protocol, e.g., using an OTDOA information request message.

According to some embodiments, the method may also include, at 540, receiving an acknowledgment confirming the activation of the PRS transmission on the designated beams from the involved serving and/or neighboring cells. In an embodiment, the receiving 540 may include receiving the acknowledgement through the NRPPa protocol, e.g., using an OTDOA information response message.

In certain embodiments, the method may also include, at 550, transmitting PRS assistance information to the UE. In an embodiment, the transmitting 550 of the assistance information may include providing the UE with network assistance information for determining reference points for positioning measurements or for UE assistance measurements. For example, after the PRS are activated, the transmitting 550 may include informing the UE about which beam-IDs and cell-IDs convey the PRS information that is relevant for that particular UE. In some embodiments, the PRS signals are not necessarily restricted to be measured by just a single UE. For instance, if nearby UEs are also requesting a positioning service, then the transmitting 550 may also include providing PRS assistance information to those nearby UE(s), and such information can be partially or entirely the same.

According to an embodiment, the method may also include, at 555, transmitting a request location information message, to the UE, requesting PRS measurements. The method may then include, at 560, receiving a report, from the UE, of the requested positioning related measurements. For example, the receiving 560 may include receiving a report of the RSTD values between PRS transmissions, using the PRS transmissions on the indicated or configured beams and cells.

Figure 5B:
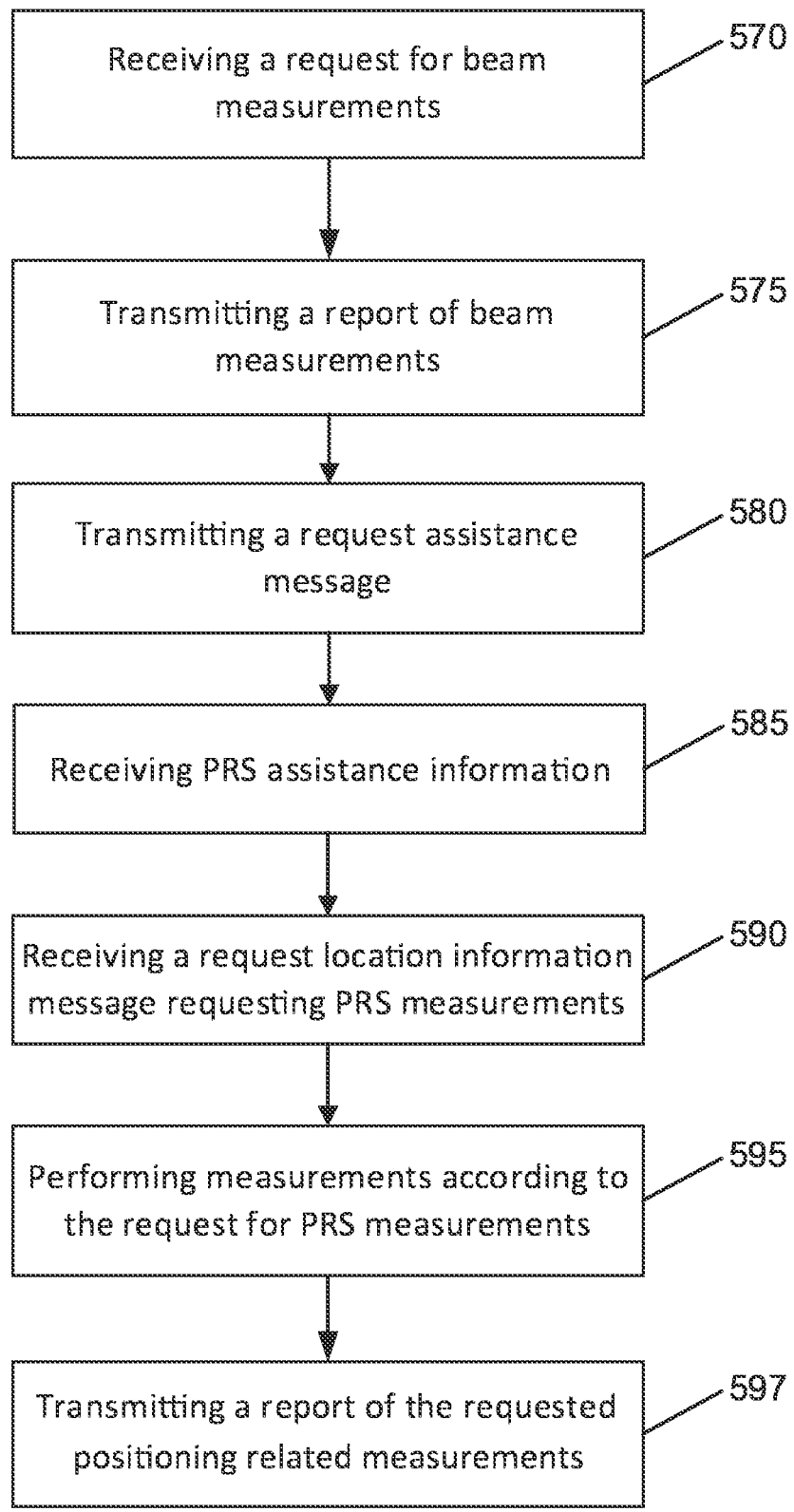
FIG. 5b illustrates an example flow diagram of a method, according to an embodiment.

FIG. 5b illustrates an example flow diagram of a method for configuring and/or measuring PRS, according to one embodiment. In certain embodiments, the method of FIG. 5b may be performed by a mobile station, mobile device, UE, IoT device, terminal, or the like, for instance.

As illustrated in the example of FIG. 5b, the method may include, at 570, receiving a request for beam measurements from a location server, such as LMF. In one example, the request may include beam measurement configuration parameters, and may be included in a Request Capabilities message. Alternatively, however, the request may be included in a separate request measurements message.

In an embodiment, the method may then include, at 575, transmitting a report of beam measurements to the location server. In one example, the transmitting 575 may include transmitting the beam measurements in a Provide Capabilities message. However, in other embodiments, the measurements may be transmitted in a separate provide measurements message, for example.

According to an embodiment, the method may also include, at 580, transmitting a request assistance message to the location server and, at 585, receiving PRS assistance information from the location server. In an embodiment, the receiving 585 of the assistance information may include receiving network assistance information for determining reference points for positioning measurements or for UE assistance measurements. For example, after the PRS are activated, the receiving 585 may include receiving information about which beam-IDs and cell-IDs convey the PRS information that is relevant for that particular UE.

According to an embodiment, the method may also include, at 590, receiving a request location information message requesting PRS measurements. The method may include, at 595, performing measurements according to the request for PRS measurements. In an embodiment, the method may then include, at 597, transmitting a report, to the location server, of the requested positioning related measurements. For example, the transmitting 597 may include transmitting a report of the RSTD values between PRS transmissions, using the PRS transmissions on the indicated or configured beams and cells.

Figure 6A:
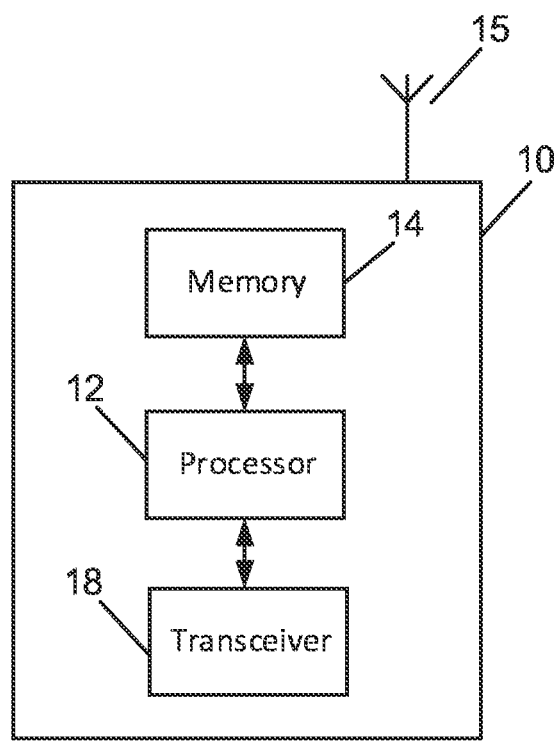
FIG. 6a illustrates an example block diagram of an apparatus, according to an embodiment.

FIG. 6a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be an eNB in LTE or gNB in 5G. In another embodiment, apparatus 10 may be or may be included in a location server, such as LMF in NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6a.

As illustrated in the example of FIG. 6a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. In another embodiment, apparatus 10 may be a location server, such as LMF.

According to certain embodiments, apparatus 10 may be controlled by memory 14 and processor 12 to perform the functions associated with any of the embodiments described herein, such as the flow or signaling diagrams illustrated in FIG. 3, 4, or 5a. In some embodiments, apparatus 10 may be configured to perform a procedure for configuring and measuring PRS, for example. In an embodiment, apparatus 10 may perform any of the functions of the LMF, as shown in FIGS. 2-4, for instance.

For instance, in one embodiment, apparatus 10 may be controlled by memory 14 and processor 12 to transmit a request for beam measurements to a UE. For example, in an embodiment, apparatus 10 may be controlled by memory 14 and processor 12 to transmit the request for beam measurements to a given UE when there is a request by a positioning client for obtaining the location of the given UE. In one example, the request may include beam measurement configuration parameters, and may be included in a Request Capabilities message. Alternatively, however, the request may be included in a separate request measurements message.

In an embodiment, apparatus 10 may be controlled by memory 14 and processor 12 to receive a report of beam measurements from the UE, and to identify the reference beams for the PRS transmission. Upon receiving the measurement report from the UE, e.g., via the LPP protocol, the cell-ID and beam-ID values from serving and neighboring cells that are detectable by the UE can be identified. In one example, apparatus 10 may be controlled by memory 14 and processor 12 to receive the beam measurements in a Provide Capabilities message. However, in other embodiments, the measurements may be received in a separate provide measurements message, for example.

According to one embodiment, apparatus 10 may be controlled by memory 14 and processor 12 to receive a request assistance message from the UE and to request, from a RAN node, on-demand PRS. For example, apparatus 10 may be controlled by memory 14 and processor 12 to use information about the detectable cell-ID and beam-ID values at the UE to trigger to the RAN an on-demand transmission of PRS. More specifically, in an embodiment, the following PRS transmission may be triggered: (i) PRS at the serving beams of the serving cell (e.g., using the above example, the transmission of PRS at beam #8 of cell A); (ii) PRS at all the detectable neighboring cell-ID and beam-ID (using the same example, a PRS transmission at beam #8 of Cell B and beam #8 of Cell B is triggered). In an embodiment, apparatus 10 may be controlled by memory 14 and processor 12 to transmit the request for on-demand triggering of PRS at the RAN via the NRPPa protocol, e.g., using an OTDOA information request message.

According to some embodiments, apparatus 10 may be controlled by memory 14 and processor 12 to receive an acknowledgment confirming the activation of the PRS transmission on the designated beams from the involved serving and/or neighboring cells. In an embodiment, apparatus 10 may be controlled by memory 14 and processor 12 to receive the acknowledgement through the NRPPa protocol, e.g., using an OTDOA information response message.

In certain embodiments, apparatus 10 may be controlled by memory 14 and processor 12 to transmit PRS assistance information to the UE. In an embodiment, apparatus 10 may be controlled by memory 14 and processor 12 to provide the UE with network assistance information for determining reference points for positioning measurements or for UE assistance measurements. For example, after the PRS are activated, apparatus 10 may be controlled by memory 14 and processor 12 to inform the UE about which beam-IDs and cell-IDs convey the PRS information that is relevant for that particular UE. In some embodiments, if other nearby UEs are also requesting a positioning service, then apparatus 10 may be controlled by memory 14 and processor 12 to provide PRS assistance information to those nearby UE(s), and such information can be partially or entirely the same.

According to an embodiment, apparatus 10 may be controlled by memory 14 and processor 12 to transmit a request location information message, to the UE, requesting PRS measurements. In one embodiment, apparatus 10 may be controlled by memory 14 and processor 12 to receive a report, from the UE, of the requested positioning related measurements. For example, apparatus 10 may be controlled by memory 14 and processor 12 to receive a report of the RSTD values between PRS transmissions, using the PRS transmissions on the indicated or configured beams and cells.

Figure 6B:
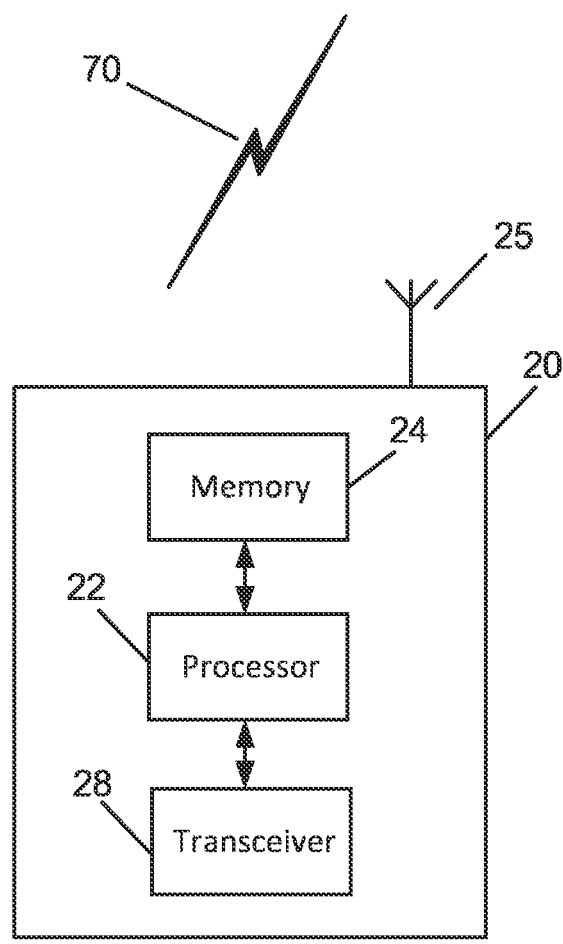
FIG. 6b illustrates an example block diagram of an apparatus, according to another embodiment.

FIG. 6b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6b.

As illustrated in the example of FIG. 6b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 3, 4, or 5b. In certain embodiments, apparatus 20 may be configured to perform a procedure for configuring and/or measuring PRS, for instance.

According to some embodiments, apparatus 20 may be controlled by memory 24 and processor 22 to receive a request for beam measurements from a location server, such as LMF. In one example, the request may include beam measurement configuration parameters, and may be included in a Request Capabilities message. Alternatively, however, the request may be included in a separate request measurements message.

In an embodiment, apparatus 20 may be controlled by memory 24 and processor 22 to transmit a report of beam measurements to the location server. In one example, apparatus 20 may be controlled by memory 24 and processor 22 to transmit the beam measurements in a Provide Capabilities message. However, in other embodiments, the measurements may be transmitted in a separate provide measurements message, for example.

According to an embodiment, apparatus 20 may be controlled by memory 24 and processor 22 to transmit a request assistance message to the location server and to receive PRS assistance information from the location server. In an embodiment, apparatus 20 may be controlled by memory 24 and processor 22 to receive network assistance information for determining reference points for positioning measurements or for UE assistance measurements. For example, after the PRS are activated, apparatus 20 may be controlled by memory 24 and processor 22 to receive information about which beam-IDs and cell-IDs convey the PRS information that is relevant for apparatus 20.

According to an embodiment, apparatus 20 may be controlled by memory 24 and processor 22 to receive a request location information message requesting PRS measurements. In one embodiment, apparatus 20 may then be controlled by memory 24 and processor 22 to perform measurements according to the request for PRS measurements. In an embodiment, apparatus 20 may be controlled by memory 24 and processor 22 to transmit a report, to the location server, of the requested positioning related measurements. For example, apparatus 20 may be controlled by memory 24 and processor 22 to transmit a report of the RSTD values between PRS transmissions, using the PRS transmissions on the indicated or configured beams and cells.

Therefore, certain example embodiments provide several technical improvements, enhancements, and/or advantages. For example, one benefit of example embodiments is that the network can use the specified beams associated with the specified signals that are detected by the UE (according to the configuration that the network provided to the UE) for transmitting PRS, thereby avoiding the transmission of unnecessary PRS. Also, according to example embodiments, the network can use the provided information to configure the UE to measure the PRS on a subset of signals, thus avoiding too many measurements used to form RSTD reports. Additionally, according to example embodiments, besides the UE measurements used for inter-cell mobility, the network may be provided with additional measurements that are tailored for positioning purposes (e.g., the L# radio resource management—RRM—measurements may be not sufficient for positioning since typically for positioning more neighboring cells are heard by the UE). Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

A first embodiment may be directed to a method that may be implemented by a network node. The method may include providing, to a UE, network assistance information for determining reference points for positioning measurements or for UE assistance measurements. The assistance information may indicate a grouping of downlink reference signals for measurements and reporting. Specific signals in a group may be considered as one reference points for location measurement using PRS or for assistance measurement for configuration of PRS.

In a variant, the grouping of the downlink reference signals may be used for at least one of the following: before the PRS are configured for the UE so that when the UE performs assistance measurements for PRS configuration it determines measurements and reporting based on the grouping information provided by network, or after UE has received the configuration for PRS to perform positioning measurements on the PRS it uses the group information when determining which signals to use for the PRS measurement and how to report the results.

In a variant, the measurements include UE assistance measurements on SSB/CSI-RS/L3 CSI-RS or PRS for UE location measurements.

In a variant, the grouping of signals may be done for PRS signals or for DL RS (SSB/CSIRS), and association between PRS and DL RS may be provided by network.

In a variant, the method may further include configuring the UE with one or more measurement reporting thresholds. In some variants, the measurement reporting threshold(s) may be based on RSRP, SINR, and/or RSRQ.

In a variant, the method may further include receiving, from the UE, a report of the measurements on PRS of the N-highest quality beam(s), e.g., based on RSRP, SINR, and/or RSRQ, that are above the measurement reporting threshold(s).

In a variant, the method may further include receiving, from the UE, a report of the measurements on PRS of the beam with highest RSRP on each group or in each cell or in a reference point. In a variant, the measurements on PRS may include RSTD reference signal time difference between different reference points.

In a variant, the method may further include, when performing group-based measurements on PRS for positioning purposes, receiving, from the UE, a report of the measurements on PRS of the beam with highest RSRP on each group/reference point. In a variant, the measurement on PRS may include RSTD reference signal time difference between different reference points or groups.

In a variant, the method may further include, when performing group-based measurements for assistance purposes, receiving, from the UE, a report of the beam or N beams with highest RSRP on each group/reference point.

In a variant, the method may further include modifying the LPP to include signaling exchange between a LMF and the UE. In a variant, this new signaling may include the (new) UE measurements, as these are configured by the network, reported to the LMF, along with the corresponding request capabilities signaled from the LMF to the UE.

In a variant, the method may further include modifying the NRPPa to include signaling exchange between the LMF and the NG_RAN. In a variant, this new signaling may include the (new) OTDOA information request signaled from the LMF to the NG_RAN, as well as the OTDOA information response signaled from NG_RAN to the LMF.

A second embodiment may be directed to a method that may be implemented by a UE. The method may include receiving, from a network, configuration for performing positioning-specific assistance measurements, and reporting the measurements to the network. The configuration for the positioning assistance measurements may include at least one of: positioning-report-specific threshold for determining if a beam quality (SSB/CSIRS/CSI_RS_L3) is suitable to be reported in assistance report, or signal type specific threshold, where the threshold is specific for signal type. In a variant, the signal type may include, for example, SSB signal/CSI-RS for beam management/CSI-RS for L3 mobility.

In a variant, the receiving may include receiving the configuration in a request capabilities message or a new request measurements message received from a LMF.

In a variant, the reporting may include reporting the measurements in a provide capabilities message or a new provide measurements message.

In a variant, the reporting may include transmitting a measurement report that includes at most N-highest quality beams above a threshold or thresholds and/or up to M cells/transmission points.

In a variant, upon receiving the configuration, the method may further include generating the assistance measurement reporting when at least one of the following conditions are fulfilled: immediately when M number of cells or reference points are available or after a time offset. In a variant, the availability of cells may mean that at least one or X candidates are detected above a configured threshold. In one example, M may be 3, for example. In a variant, a timer may be started when the assistance measurement request is received. In one example, the timer may expire when measurement reporting criteria is triggered as above and, when the timer expires and the UE has detected less than M cells or reference points to be available, the UE may report the subset of cell and beams.

In a variant, the UE may have specific reporting configuration for reporting and measurement of specific beam types depending on the configured threshold or thresholds. In one example, the beams may be reported with the following priority when applicable for serving or neighbor cells: (1) radio link monitoring RS, (2) beam failure detection RS, (3) TCI States for PDCCH (CSI-RS for beam management /SSB), (4) TCI States for PDSCH (CSI-RS for beam management /SSB), (5) CSI-RS for L3 mobility, and (6) SSB. In a further variant, if signal type (SSB/CSI-RS/CSI-RS for L3) specific thresholds are configured, then the ones with threshold values are prioritized. Alternatively, in another variant, only signals with thresholds are considered in reporting.

In another variant, when the UE performs assistance measurements on either SSB/CSI-RS/CSI-RS for L3 mobility beam specific reporting of measurement results, the method may include reporting in beam or panel specific manner including panel/beam ID in the reported beam measurements.

A third embodiment is directed to an apparatus including at least one processor and at least one memory comprising computer program code. The at least one memory and computer program code may be configured, with the at least one processor, to cause the apparatus at least to perform the method according to the first embodiment or the second embodiment, or any of their variants.

A fourth embodiment is directed to an apparatus that may include circuitry configured to perform the method according to the first embodiment or the second embodiment, or any of the variants discussed above.

A fifth embodiment is directed to an apparatus that may include means for performing the method according to the first embodiment or the second embodiment, or any of the variants discussed above.

A sixth embodiment is directed to a computer readable medium comprising program instructions stored thereon for performing at least the method according to the first embodiment or the second embodiment, or any of the variants discussed above.

What is claimed is:

1. An apparatus, comprising: at least one processor; and at least one memory comprising computer program code, wherein the at least one memory and computer program code are configured, with the at least one processor, to cause the apparatus at least to:
    receive, by a user equipment from a network, configuration information for determining reference points for positioning measurements or for user equipment assistance measurements,
    wherein the configuration information indicates a grouping of downlink reference signals for measurements and reporting;
    wherein the grouping of downlink reference signals is done for positioning reference signals or for downlink reference signals, and wherein an explicit association between the positioning reference signals and downlink reference signals, based on grouping information, is received from the network, and
    wherein the grouping information includes information for associating positioning reference signals with downlink reference signals based on at least one of offset or spatial parameters.

2. The apparatus according to claim 1, wherein the measurements comprise user equipment assistance measurements on synchronization signal physical broadcast channel blocks, channel state information reference signals, layer 3 channel state information reference signals or positioning reference signals for user equipment location measurements.

3. The apparatus according to claim 1, wherein the at least one memory and computer program code are configured, with the at least one processor, to cause the apparatus at least to:
    receive a configuration with at least one measurement reporting threshold.

4. The apparatus according to claim 3, wherein the at least one measurement reporting threshold is based on at least one of reference signal received power, signal to interference and noise ratio, or reference signal received quality.

5. The apparatus according to claim 3, wherein the at least one memory and computer program code are configured, with the at least one processor, to cause the apparatus at least to:
    transmit a report of the measurements on positioning reference signals of N-highest quality that are above the at least one measurement reporting threshold.

6. The apparatus according to claim 3, wherein the at least one memory and computer program code are configured, with the at least one processor, to cause the apparatus at least to:
    transmit a report of the measurements on positioning reference signals of a beam with highest reference signal received power on each group or in each cell or in a reference point.

7. The apparatus according to claim 3, wherein the measurements on positioning reference signals comprise reference signal time difference between different reference points.

8. The apparatus according to claim 1, wherein, when performing group-based measurements on positioning reference signals for positioning purposes, the at least one memory and computer program code are configured, with the at least one processor, to cause the apparatus at least to:
    transmit a report of the measurements on positioning reference signals of a beam with highest reference signal received power on each group or reference point.

9. The apparatus according to claim 1, wherein, when performing group-based measurements for assistance purposes, the at least one memory and computer program code are configured, with the at least one processor, to cause the apparatus at least to:
    transmit a report of a beam or N beams with highest reference signal received power on each group or reference point.

10. The apparatus according to claim 1, wherein the configuration for the positioning measurements comprises at least one of a positioning-report-specific threshold for determining if a beam quality is suitable to be reported in an assistance report or a signal type specific threshold.

11. The apparatus according to claim 1,
    wherein the grouping of downlink reference signals is done for positioning reference signals and where the group of positioning reference signals are from a same cell,
    wherein the measurements comprise user equipment assistance measurements on positioning reference signals,
    wherein the positioning reference signals measurements comprise a reference signal received power measurement, and
    wherein the reporting comprises user equipment reporting in beam specific manner including a beam identifier.

12. An apparatus, comprising: at least one processor; and at least one memory comprising computer program code, wherein the at least one memory and computer program code are configured, with the at least one processor, to cause the apparatus at least to:
    provide, to a user equipment, configuration information for determining reference points for positioning measurements or for user equipment assistance measurements,
    wherein the configuration information indicates a grouping of downlink reference signals for measurements and reporting
    wherein the grouping of downlink reference signals is done for positioning reference signals or for downlink reference signals,
    wherein an explicit association between the positioning reference signals and downlink reference signals, based on grouping information, is received from a network, and
    wherein the grouping information includes information for associating positioning reference signals with downlink reference signals based on at least one of offset or spatial parameters.

13. The apparatus according to claim 12,
    wherein the grouping of the downlink reference signals is used before positioning reference signals are configured for the user equipment so that, when the user equipment performs assistance measurements for the positioning reference signals configuration, the user equipment determines measurements and reporting based on the grouping information provided; or wherein the grouping of the downlink reference signals is used after the user equipment has received the configuration for the positioning reference signals to perform positioning measurements on the positioning reference signals using the grouping information when determining which signals to use for the positioning reference signals measurement and how to report results.

14. The apparatus according to claim 12, wherein the grouping of downlink reference signals is done for positioning reference signals and where the group of positioning reference signals are from a same cell, wherein the measurements comprise user equipment assistance measurements on positioning reference signals, wherein the positioning reference signals measurements comprise a reference signal received power measurement, and wherein the reporting comprises user equipment reporting in beam specific manner including a beam identifier.

15. A method, comprising:

receiving at user equipment, from a network, configuration information for performing positioning assistance measurements;

wherein the configuration information indicates a grouping of downlink reference signals for measurements and reporting, wherein the grouping of downlink reference signals is done for positioning reference signals or for downlink reference signals, wherein an explicit association between the positioning reference signals and downlink reference signals, based on grouping information, is received from the network, and wherein the grouping information includes information for associating positioning reference signals with downlink reference signals based on at least one of offset or spatial parameters.

16. The method according to claim 15, wherein the configuration for the positioning assistance measurements comprises at least one of a positioning-report-specific threshold for determining if a beam quality is suitable to be reported in an assistance report or a signal type specific threshold.

17. The method according to claim 16, wherein the positioning-report-specific threshold is based on at least one of reference signal received power, signal to interference and noise ratio, or reference signal received quality.

* * * * *